United States Patent [19]

Egnell et al.

[11] Patent Number: 4,893,466
[45] Date of Patent: Jan. 16, 1990

[54] METHOD OF OPERATING A GAS TURBINE UNIT

[75] Inventors: Roland Egnell; Ben Kyrklund; Svante Stenfors, all of Finspang, Sweden; Henrik Harboe, Copenhagen, Denmark

[73] Assignee: Asea Stal AB, Finspang, Sweden

[21] Appl. No.: 355,038

[22] Filed: May 15, 1989

Related U.S. Application Data

[63] Continuation of Ser. No. 43,967, Apr. 29, 1987, abandoned.

[30] Foreign Application Priority Data

Apr. 29, 1986 [SE] Sweden .................................. 8602003

[51] Int. Cl.⁴ ................................................ F02C 6/18
[52] U.S. Cl. ................................. 60/39.03; 60/39.161; 60/39.182
[58] Field of Search ................ 60/39.03, 39.04, 39.161, 60/39.182, 39.55

[56] References Cited

U.S. PATENT DOCUMENTS

| | | | |
|---|---|---|---|
| 2,095,991 | 10/1937 | Lysholm | 60/39.03 |
| 3,038,308 | 6/1962 | Fuller | 60/39.55 |
| 3,335,565 | 8/1967 | Aguet | 60/39.182 |
| 3,795,816 | 3/1974 | Frei | |
| 4,132,064 | 1/1979 | Kumm | 60/39.161 |

FOREIGN PATENT DOCUMENTS 210657 10/1940 Switzerland .
2094404 3/1982 United Kingdom .

Primary Examiner—Louis J. Casaregola
Attorney, Agent, or Firm—Merchant, Gould, Smith, Edell, Welter & Schmidt

[57] ABSTRACT

The invention relates to a method of operating a gas turbine unit comprising a combustion chamber, a high pressure turbine driven by gas from the combustion chamber, and a low pressure turbine driven by gas from the high pressure turbine, means for controlling the gas supply from the high pressure turbine to the low pressure turbine, and a low pressure compressor driven by the low pressure turbine, and a high pressure compressor connected in series with the low pressure compressor and driven by the high pressure turbine for supplying pressurized air to the combustion chamber, the useful power of the gas turbine unit being adjustable by controlling the gas condition upstream of the low pressure turbine by the control means. Substantially all the air delivered to the combustion chamber from the compressors, is utilized for the combustion in the combustion chamber. The generated gas is cooled with water and/or steam to a temperature which corresponds to the maximum operating temperature of the high pressure turbine. Use is made of the power obtained from tHe combustion chamber by cooling, and the useful power of the gas turbine unit is recovered from the high pressure turbine at substantially constant rotational speed thereof. The temperature of the gas supplied to the high pressure turbine is maintained substantially constant independently of the useful power recovered from the gas turbine unit.

1 Claim, 1 Drawing Sheet

METHOD OF OPERATING A GAS TURBINE UNIT

This is a continuation of application Ser. No. 043,967 filed Apr. 29, 1987, abandoned.

The invention relates to a method of operating a gas turbine unit comprising a combustion chamber, a high pressure turbine driven by gas from the combustion chamber and a low pressure turbine driven by the exhaust gas from the high pressure turbine, means for controlling the gas supply from the high pressure turbine to the low pressure turbine, and a low pressure compressor driven by the low pressure turbine, and a high pressure compressor connected in series with the low pressure compressor and driven by the high pressure turbine for supplying pressurized air to the combustion chamber, the useful power of the gas turbine unit being adjustable by controlling the gas condition upstream of the low pressure turbine by said means.

CH-A-210,657 describes a gas turbine unit of the type referred to above. This prior art unit moreover includes an intermediate pressure turbine between the high pressure turbine and the low pressure turbine, the total power delivered from the combustion chamber being supplied to the turbine unit for recovering the useful power from the shaft of the intermediate pressure turbine, the only purpose of the high pressure turbine being the operation of the high pressure compressor.

There are no particulars in the Swiss patent specification as to the operating temperature of the gas turbine unit; the only existing indication of the temperature refers to the means, comprising rotatable vanes, for controlling the supply of gas to the low pressure turbine, said means being said to operate in a lower temperature range, e.g. 200° C. Moreover, the efficiency of the unit is not mentioned in the patent specification. However, it may be presupposed that the efficiency is low, because at the time when the prior art gas turbine unit was invented at the end of the 1930s the efficiencies applied were less than 30% also when an intermediate cooler and a recuperator were used.

However, it is well known that the efficiency of more modern gas turbine units usually is of the order of 30 to 35% (if neglecting the increase of the efficiency which can be obtained by using an intermediate cooler, a recuperator, etc.). The reason for the efficiency not being higher is that the exhaust gas from the unit, which is allowed to escape to the surroundings through a chimney or the like, is at a relatively high temperature (of the order of 500° C.). This exhaust gas besides contains a large amount of air which has been supplied by the compressors but has not been utilized for the combustion.

In order to increase the useful power from a gas turbine unit comprising a turbine and a compressor driven by the turbine, it has previously been proposed to utilize all air from the compressor for the combustion of the fuel supplied to the combustion chamber and to cool the gas from the combustion chamber to a temperature of about 450° C. by generating steam in tubes in the combustion chamber. The steam drives a steam turbine. In this prior art system, the so-called Velox system, the total useful power is taken from the steam-driven turbine, while gas is supplied to the gas turbine from the combustion chamber at a considerably reduced temperature and does not produce more power than that required for the operation of the compressor. There is obtained an increase of the efficiency to about 38%, but there is also required a considerably larger combustion chamber, which means an increased plant investment.

The purpose of the invention is to implement the use of a compact combined plant, i.e. a turbine plant having gas turbine as well as steam turbine as in the Velox system, while obtaining a higher efficiency and utilizing all the compressor air for the combustion, and for this purpose the method of the kind referred to above is proposed. Then, the useful power is thus taken not from an intermediate pressure turbine as in case of the plant according to the Swiss patent specification, but partly from the high pressure turbine at a substantially constant rotational speed and partly from the steam turbine. Due to the fact that the high pressure turbine and accordingly the high pressure compressor connected therewith are driven at a substantially constant rotational speed, the risk of pumping in the low pressure compressor is reduced.

By the method of the invention there is obtained an increase of the total efficiency to about 41% and moreover this efficiency can be maintained substantially constant over the major portion of the load range due to the fact that the temperature of the gas supplied to the high pressure turbine is kept substantially constant.

BRIEF DESCRIPTION OF THE DRAWINGS

For a more detailed explanation of the invention reference is made to the accompanying drawings wherein.

DETAILED DESCRIPTION

Figure 1:
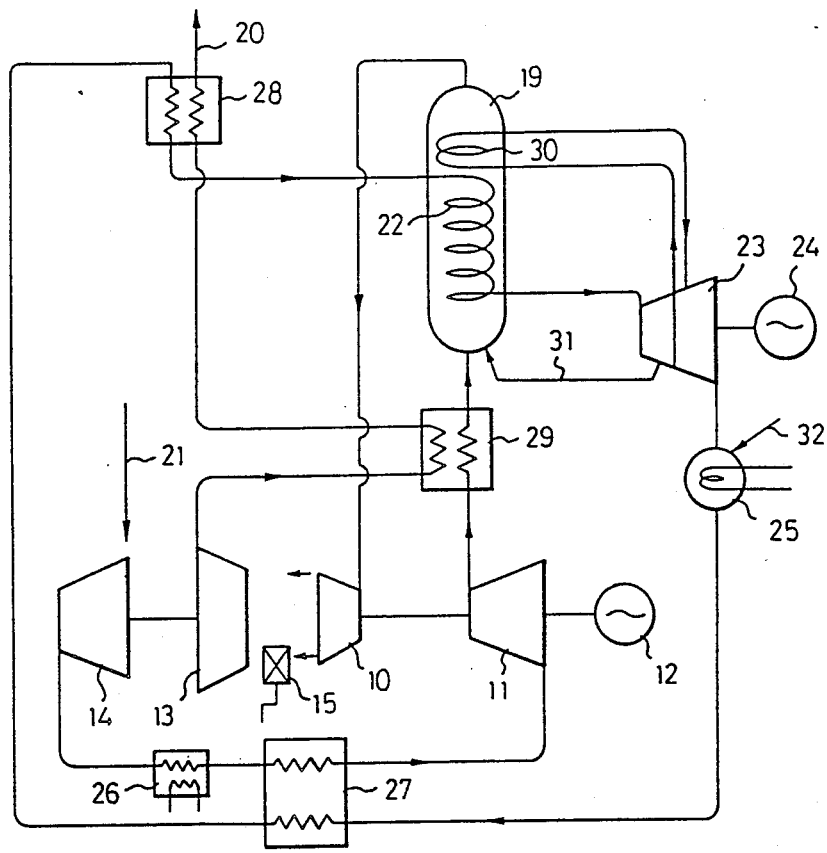
FIG. 1 is a diagram of a turbine plant for working the method of the invention.
Figure 2:
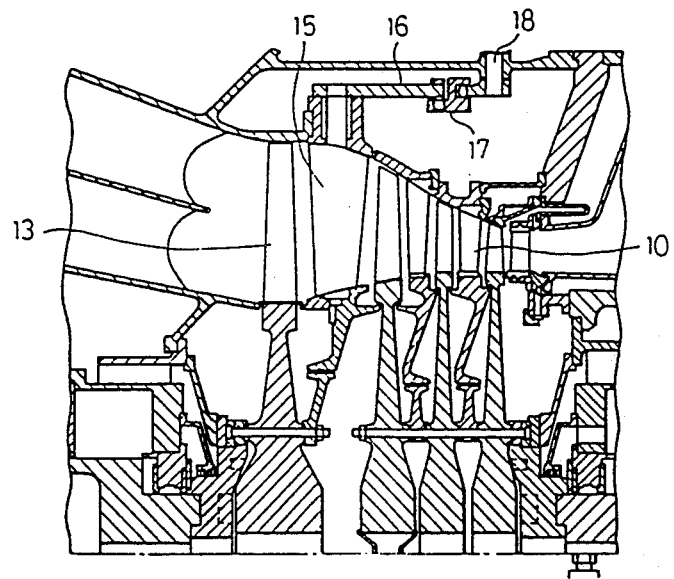
FIG. 2 is a fragmentary axial sectional view of the turbine portion of the turbine unit.

Referring to FIG. 1, the turbine plant shown therein comprises a turbine unit including a high pressure turbine 10 connected to a high pressure compressor 11 and an electric generator 12 for delivering useful power from the unit, and a low pressure turbine 13 connected to a low pressure compressor 14. An adjustable connection is provided between the high pressure turbine and the low pressure turbine, said connection in this case being constructed as a vane ring having adjustable (rotatable) vanes 15, FIG. 2, each connected at an arm 16 to a ring 17 which can be rotated by means of a control member 18 constituting the power control member of the turbine unit.

By means of the rotatable vanes the relationship between the expansion in the high pressure turbine and the expansion in the low pressure turbine is controlled. This control takes place at low flow losses and therefore provides an efficiency which is improved over other types of control, e.g. shunt or choke valve control.

A combustion chamber 19 (furnace) is connected at the gas outlet thereof to the high pressure turbine for supplying gas to this turbine and the low pressure turbine connected in series therewith. The low pressure turbine is connected to a chimney as indicated by an arrow 20. The air inlet of the combustion chamber is connected to the high pressure compressor for the supply of combustion air. The high pressure compressor is connected in series with the low pressure compressor which takes air from the surroundings as indicated by an arrow 21.

The combustion chamber is provided with tubes and/or a tube jacket as has been indicated by a coil 22, which is included in a steam circuit including also a steam turbine 23 which is connected to an electric generator for the delivery of useful power, and a condenser 25.

In the basic system thus described, there are provided devices which can be optionally included therein. Thus, an external intermediate cooler 26 is provided in the connection between the low pressure compressor and the high pressure compressor where also an internal intermediate cooler 27 is provided for heat exchange between the air in the compressor circuit and the condensate from the condenser (feed water). The temperature of the air to the high pressure compressor is reduced by the intermediate cooling, the feed water to the furnace at the same time being preheated in the internal intermediate cooler 27.

Also an economizer 28 is provided as a heat exchanger between the feed water and the exhaust gas to the chimney for preheating the feed water to the combustion chamber.

A recuperator 29 is provided between the exhaust gas conduit of the low pressure turbine and the air inlet conduit of the combustion chamber from the high pressure compressor for heating the compressor air by heat exchange with the exhaust gas, which is advantageous when the turbine unit is driven at part load when the temperature of the air from the high pressure compressor can be too low.

A reheat circuit 30 is provided between the steam turbine and the combustion chamber so as to increase the efficiency of the steam process.

As a specific refinement, steam is tapped from the steam turbine at the same pressure as that existing in the combustion chamber and is injected into the combustion chamber as indicated at 31 so as to reduce the NOX content in the gas delivered from the combustion chamber. Water is supplied to the condenser from an external source as indicated at 32 so as to compensate for steam being tapped.

The turbine plant described operates principally as follows. The combustion gas generated in the combustion chamber is cooled by means of the steam circuit to the maximum operating temperature of the high pressure turbine, e.g. 950° C., and is supplied to the high pressure turbine for the operation thereof at a predetermined gas condition (pressure and temperature) at the input side of the high pressure turbine and at a substantially constant rotational speed. Exhaust gas from the high pressure turbine is supplied to the low pressure turbine via the rotatable vanes which are adjusted so as to match the exhaust gas flow to the existing load. The two compressors deliver pressurized combustion air to the combustion chamber. The useful power is delivered partly from the generator 12 driven directly by the high pressure turbine, and partly by the generator 24 driven by the steam circuit which takes care of the heat recovered from the generated gas so as to lower the temperature thereof.

By controlling the gas condition upstream of the high pressure turbine and by recovering the useful power directly from the high pressure turbine at a substantially constant rotational speed there is obtained a higher total efficiency of the turbine plant than could be obtained previously, viz. about 41%, and this figure can be further improved by the optional arrangement of an intermediate cooler, a recuperator, an economizer, etc.

At a load drop, e.g. if the generator 12 falls out of step with the net, the rotational speed of the high pressure turbine 10 must be controlled so as to avoid a too high overspeeding of the turbine shaft. This is effected by adjusting the vanes 15, as is necessary in order to stall (i.e., to reduce its efficiency) the rotor of the low pressure turbine, which provides a pressure increase upstream of the low pressure turbine 13 and a decrease of the pressure and heat drop over the high pressure turbine 10, the power output therefrom also decreasing. At the same time the pressure and heat drop over the low pressure turbine 13 will increase, but due to the reduction of the efficiency of the low pressure turbine as a consequence of stalling the rotor thereof, the power delivery from the low pressure turbine will be substantially unchanged. In this manner unallowable overspeeding can be avoided and the generator can again be synchronized with the net after some seconds, which is effected by adjusting the rotational speed of the high pressure turbine 10 to the desired value by means of the vanes.

We claim:

1. Method of operating a gas turbine unit for power generation on an electrical power grid for maximum efficiency minimizing polluting emissions and controlling accurately rotational speed within predetermined limits comprising a combustion chamber, a high pressure turbine, a high pressure compressor driven by said high pressure turbine, a low pressure turbine, said low and high pressure turbine being in fluid communication through adjustable flow control vanes and a low pressure compressor driven by said low pressure turbine, said high pressure and low pressure compressors being connected in series, the method comprising the steps of:
   (a) supplying pressurized air from the compressors to the combustion chamber;
   (b) adjusting the useful power of the gas turbine unit by controlling the gas condition upstream of the low pressure turbine;
   (c) utilizing substantially all of the air delivered to the combustion chamber from the compressors for the combustion in the combustion chamber;
   (d) cooling the gas generated in the combustion chamber by producing steam from water heated by the gas in a system separated from the gas to a temperature which corresponds to the maximum operating temperature of the high pressure turbine to limit formation of polluting emissions;
   (e) utilizing the power of said steam in a steam turbine by said cooling of the generated gas;
   (f) recovering the useful power of the gas turbine unit from the high pressure turbine;
   (g) maintaining the temperature of the gas supplied to the high pressure turbine by controlling the heat supply to the gas generated in the combustion chamber independently of the useful power recovered from the gas turbine unit; and
   (h) controlling the flow of gas between said high and low pressure turbines by adjustment of said flow control vanes to limit the rotational speed of the high pressure turbine to stall the rotor of the low pressure turbine.

* * * * *

UNITED STATES PATENT AND TRADEMARK OFFICE
CERTIFICATE OF CORRECTION

PATENT NO.   : 4,893,466

DATED        : 16 January 1990

INVENTOR(S)  : Roland Egnell, Ben Kyrklund, Svante Stemfors, Henrik Harboe

It is certified that error appears in the above-identified patent and that said Letters Patent is hereby corrected as shown below:

Column 4, line 32 "turbine" should be --turbines--.

Signed and Sealed this

Twentieth Day of August, 1991

Attest:

HARRY F. MANBECK, JR.

*Attesting Officer*         Commissioner of Patents and Trademarks